US007124237B2

(12) United States Patent
Overton et al.

(10) Patent No.: US 7,124,237 B2
(45) Date of Patent: Oct. 17, 2006

(54) VIRTUAL MACHINE EMULATION IN THE MEMORY SPACE OF A PROGRAMMABLE PROCESSOR

(75) Inventors: Chad R. Overton, Yukon, OK (US); Sunil A. Mehta, Longmont, CO (US); John M. Larson, Yukon, OK (US); Scott E. Errington, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 341 days.

(21) Appl. No.: 10/678,296

(22) Filed: Oct. 3, 2003

(65) Prior Publication Data

US 2004/0123290 A1 Jun. 24, 2004

Related U.S. Application Data

(60) Provisional application No. 60/415,825, filed on Oct. 3, 2002.

(51) Int. Cl.
*G06F 12/00* (2006.01)

(52) U.S. Cl. .............................................. 711/6; 718/1

(58) Field of Classification Search ................ 711/163, 711/6; 710/5; 712/228; 717/106, 139; 715/526; 718/1
See application file for complete search history.

(56) References Cited

U.S. PATENT DOCUMENTS 4,396,994 A 8/1983 Kang et al.
4,493,027 A * 1/1985 Katz et al. .................. 712/228
4,525,780 A * 6/1985 Bratt et al. ................. 711/163
4,583,197 A 4/1986 Chappell et al.
4,722,068 A 1/1988 Kuroda et al.
4,724,521 A * 2/1988 Carron et al. ............... 717/175
4,761,756 A 8/1988 Lee et al.
4,823,300 A 4/1989 Malinowski
4,860,240 A 8/1989 Hartley et al.
4,890,251 A 12/1989 Nitta et al.
5,153,850 A 10/1992 Williams
5,181,184 A 1/1993 Shim et al.
5,210,876 A * 5/1993 Uchida ........................ 717/139
5,467,296 A 11/1995 Suzuki
5,469,574 A * 11/1995 Chang et al. ............... 717/106
5,528,739 A * 6/1996 Lucas et al. ................ 715/526
6,014,684 A 1/2000 Hoffman
6,021,273 A * 2/2000 Griesemer .................. 717/148
6,138,174 A * 10/2000 Keeley ........................... 710/5
6,142,682 A 11/2000 Skogby
6,157,961 A * 12/2000 Kessler et al. .............. 719/315
6,192,516 B1 * 2/2001 Griesemer .................. 717/139
6,282,501 B1 8/2001 Assouad (Continued)

*Primary Examiner*—Pierre Bataille
*Assistant Examiner*—Paul Schlie
(74) *Attorney, Agent, or Firm*—Fellers, Snider, et al.

(57) ABSTRACT

Apparatus and method for emulating a virtual machine within the physical memory space of a programmable processor using virtual functions having a format independent of the hardware architecture of the processor. The virtual functions are executed using an execution engine emulated in the processor. A symbol table maps the virtual functions to native functions in the memory space, and a gate call interface block accesses the symbol table and initiates execution of the corresponding native function in response to each executed virtual function. Execution of the corresponding native function operates to evaluate the concurrent execution of at least one other native function. In this way for example, standardized platform virtual code can be generated for a number of different types of processors and used to evaluate the native operational routines of each processor.

16 Claims, 10 Drawing Sheets

U.S. PATENT DOCUMENTS

| | | | | |
|---|---|---|---|---|
| 6,289,504 | B1 * | 9/2001 | Cierniak et al. | 717/148 |
| 6,308,255 | B1 | 10/2001 | Gorishek, IV et al. | |
| 6,324,635 | B1 | 11/2001 | Van Dyke et al. | |
| 6,347,326 | B1 | 2/2002 | Jensen et al. | |
| 6,360,194 | B1 | 3/2002 | Egolf | |
| 6,385,712 | B1 | 5/2002 | Campbell | |
| 6,389,384 | B1 | 5/2002 | Hampshire et al. | |
| 6,463,582 | B1 | 10/2002 | Lethin et al. | |
| 6,480,952 | B1 | 11/2002 | Gorishek, IV et al. | |

* cited by examiner

| | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | | | | | | | | | | | | | | | | | | | | | | | | | | | | | | | | 8-BIT BYTE REGISTERS | |
| | | | | | | | | | | | | | | | | | | | | | | | | 16-BIT WORD REGISTERS | | | | | | | | | |
| | 32-BIT DOUBLE WORD REGISTERS | | | | | | | | | | | | | | | | | | | | | | | | | | | | | | | | |
| R0 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| R1 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| R2 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| R3 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| R4 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| R5 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| SP | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| IP | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| CPUSR | Z | C | N | V | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | A | B | D |

| NAME | PARAMETERS | DESCRIPTION | Z | C | N | V | NOTES | BITS | | | | | | | | | | | | | | | |
|---|---|---|---|---|---|---|---|---|---|---|---|---|---|---|---|---|---|---|---|---|---|---|---|
| LOAD/STORE/NOP | | | | | | | | | | | | | | | | | | | | | | | |
| NOP | | NO OPERATION | | | | | | 0 | 0 | 1 | 0 | 0 | 0 | 0 | 0 | X | X | X | X | X | X | X | X |
| LDI | Rd, #VALUE | LOAD IMMEDIATE VALUE TO REGISTER | | | | | | 0 | 0 | 1 | 0 | 0 | 0 | 0 | 1 | G | G | Rd | | | X | X | X |
| LDG | Rd, Rp OR #ABSOLUTE | LOAD GLOBAL VARIABLE FROM MEMORY | | | | | | 0 | 0 | 1 | 0 | 0 | 0 | 1 | 1 | G | G | Rd | | | Rp | | |
| STG | Rd, Rp OR #ABSOLUTE | STORE GLOBAL VARIABLE TO MEMORY | | | | | | 0 | 0 | 1 | 0 | 0 | 1 | 0 | 1 | G | G | Rs | | | Rp | | |
| LDL | Rd, #OFFSET | LOAD LOCAL VARIABLE FROM MEMORY | | | | | ADDR=SP+#OFFSET | 0 | 0 | 1 | 0 | 0 | 1 | 1 | 1 | G | G | Rd | | | X | X | X |
| STL | Rd, #OFFSET | STORE LOCAL VARIABLE TO MEMORY | | | | | ADDR=SP+#OFFSET | 0 | 0 | 1 | 0 | 1 | 0 | 0 | 1 | G | G | Rs | | | X | X | X |
| SXX | Rs | SIGN EXTEND REGISTER TO 32 BIT | | | | | | 0 | 0 | 1 | 0 | 1 | 0 | 1 | 1 | G | G | Rs | | | X | X | X |
| MOV | Rd, Rs | REGISTER TO REGISTER MOVE | | | | | | 0 | 0 | 1 | 0 | 1 | 1 | 0 | 0 | G | G | Rd | | | Rs | | |
| TST | Rs | TEST REGISTER AND SET FLAGS | X | | X | | | 0 | 0 | 1 | 0 | 1 | 1 | 1 | 0 | G | G | Rs | | | X | X | X |
| ARITHMETIC | | | | | | | | | | | | | | | | | | | | | | | |
| ADD | Rd, Rv OR #VALUE | ADD | X | X | X | X | | 0 | 1 | 0 | 0 | 0 | 0 | 0 | 1 | G | G | Rd | | | Rv or X | | |
| ADC | Rd, Rv OR #VALUE | ADD WITH CARRY | X | X | X | X | | 0 | 1 | 0 | 0 | 0 | 0 | 1 | 1 | G | G | Rd | | | Rv or X | | |
| SUB | Rd, Rv OR #VALUE | SUBTRACT | X | X | X | X | | 0 | 1 | 0 | 0 | 0 | 1 | 0 | 1 | G | G | Rd | | | Rv or X | | |
| SBC | Rd, Rv OR #VALUE | SUBTRACT WITH CARRY | X | X | X | X | | 0 | 1 | 0 | 0 | 0 | 1 | 1 | 1 | G | G | Rd | | | Rv or X | | |
| CMP | Ra, Rv OR #VALUE | COMPARE | X | X | X | X | | 0 | 1 | 0 | 0 | 1 | 0 | 0 | 1 | G | G | Ra | | | Rv or X | | |
| ABS | Rd | ABSOLUTE VALUE | | | | | | 0 | 1 | 0 | 0 | 1 | 0 | 1 | 0 | G | G | Rd | | | X | X | X |
| MUL | Rd, Rv OR #VALUE | MULTIPLY | | | | X | Rd=Rd*Rv (UNSIGNED) | 0 | 1 | 0 | 0 | 1 | 1 | 0 | 1 | G | G | Rd | | | Rv or X | | |
| IMUL | Rd, Rv OR #VALUE | SIGNED MULTIPLY | | | | X | Rd=Rd*Rv (SIGNED) | 0 | 1 | 0 | 0 | 1 | 1 | 1 | 1 | G | G | Rd | | | Rv or X | | |
| DIV | Rd, Rv OR #VALUE | DIVIDE | | | | | Rd=Rd/Rv (UNSIGNED) | 0 | 1 | 0 | 1 | 0 | 0 | 0 | 1 | G | G | Rd | | | Rv or X | | |
| IDIV | Rd, Rv OR #VALUE | SIGNED DIVIDE | | | | | Rd=Rd/Rv (SIGNED) | 0 | 1 | 0 | 1 | 0 | 0 | 1 | 1 | G | G | Rd | | | Rv or X | | |
| MOD | Rd, Rv OR #VALUE | MODULUS | | | | | Rd=Rd%Rv (UNSIGNED) | 0 | 1 | 0 | 1 | 0 | 1 | 0 | 1 | G | G | Rd | | | Rv or X | | |
| IMOD | Rd, Rv OR #VALUE | SIGNED MODULUS | | | | | Rd=Rd%*Rv (SIGNED) | 0 | 1 | 0 | 1 | 0 | 1 | 1 | 1 | G | G | Rd | | | Rv or X | | |
| LOGICAL | | | | | | | | | | | | | | | | | | | | | | | |
| AND | Rd, Rm OR #MASK | BITWISE LOGICAL AND | | | | | | 0 | 1 | 1 | 0 | 0 | 0 | 0 | 1 | G | G | Rd | | | Rm OR X | | |
| ORR | Rd, Rm OR #MASK | BITWISE LOGICAL OR | | | | | | 0 | 1 | 1 | 0 | 0 | 0 | 1 | 1 | G | G | Rd | | | Rm OR X | | |
| XOR | Rd, Rm OR #MASK | BITWISE LOGICAL XOR | | | | | | 0 | 1 | 1 | 0 | 0 | 1 | 0 | 1 | G | G | Rd | | | Rm OR X | | |
| NOT | Rd | BITWISE COMPLEMENT | | | | | | 0 | 1 | 1 | 0 | 0 | 1 | 1 | 0 | G | G | Rd | | | X | X | X |

FIG. 7

| NAME | PARAMETERS | DESCRIPTION | Z | C | N | V | NOTES | BITS | | | | | | | | | | | | | | | |
|---|---|---|---|---|---|---|---|---|---|---|---|---|---|---|---|---|---|---|---|---|---|---|---|
| SHIFT | | | | | | | | | | | | | | | | | | | | | | | |
| LSL | Rd, Rn | LOGICAL SHIFT LEFT | | | | | SHIFT LEFT, ZERO FILL | 1 | 0 | 0 | 0 | 0 | 0 | 0 | 0 | G | G | Rd | | | Rn | | |
| LSR | Rd, Rn | LOGICAL SHIFT RIGHT | | | | | SHIFT RT, ZERO FILL | 1 | 0 | 0 | 0 | 0 | 0 | 1 | 0 | G | G | Rd | | | Rn | | |
| ASR | Rd, Rn | ARITHMETIC SHIFT RIGHT | | | | | SHIFT RT, SIGNBIT FILL | 1 | 0 | 0 | 0 | 0 | 1 | 0 | 0 | G | G | Rd | | | Rn | | |
| ROR | Rd, Rn | ROTATE RIGHT | | X | | | ROT RT INTO CARRY | 1 | 0 | 0 | 0 | 0 | 1 | 1 | 0 | G | G | Rd | | | Rn | | |
| RRX | Rd, Rn | ROTATE RIGHT EXTENDED | | X | | | ROT RT THRU CARRY | 1 | 0 | 0 | 0 | 1 | 0 | 0 | 0 | G | G | Rd | | | Rn | | |
| CLC | | CLEAR CARRY | | X | | | | 1 | 0 | 0 | 0 | 1 | 0 | 1 | 0 | X | X | X | X | X | X | X | X |
| STC | | SET CARRY | | X | | | | 1 | 0 | 0 | 0 | 1 | 1 | 0 | 0 | X | X | X | X | X | X | X | X |
| CMC | | COMPLEMENT CARRY | | X | | | | 1 | 0 | 0 | 0 | 1 | 1 | 1 | 0 | X | X | X | X | X | X | X | X |
| BRANCH | | | | | | | | | | | | | | | | | | | | | | | |
| JMP | #OFFSET | JUMP | | | | | ALWAYS | 1 | 0 | 1 | 0 | 0 | 0 | 0 | 1 | 0 | 0 | X | X | X | X | X | X |
| JEQ | #OFFSET | JUMP EQUAL | | | | | Z SET | 1 | 0 | 1 | 0 | 0 | 0 | 1 | 1 | 0 | 0 | X | X | X | X | X | X |
| JNE | #OFFSET | JUMP NOT EQUAL | | | | | Z CLEAR | 1 | 0 | 1 | 0 | 0 | 1 | 0 | 1 | 0 | 0 | X | X | X | X | X | X |
| JPL | #OFFSET | JUMP PLUS | | | | | N CLEAR | 1 | 0 | 1 | 0 | 0 | 1 | 1 | 1 | 0 | 0 | X | X | X | X | X | X |
| JMI | #OFFSET | JUMP MINUS | | | | | N SET | 1 | 0 | 1 | 0 | 1 | 0 | 0 | 1 | 0 | 0 | X | X | X | X | X | X |
| JLO | #OFFSET | JUMP LOWER (UNSIGNED COMPARE) | | | | | C CLEAR | 1 | 0 | 1 | 0 | 1 | 0 | 1 | 1 | 0 | 0 | X | X | X | X | X | X |
| JHS | #OFFSET | JUMP HIGHER SAME (UNSIGNED COMPARE) | | | | | C SET | 1 | 0 | 1 | 0 | 1 | 1 | 0 | 1 | 0 | 0 | X | X | X | X | X | X |
| JVC | #OFFSET | JUMP OVERFLOW CLEAR | | | | | V CLEAR | 1 | 0 | 1 | 0 | 1 | 1 | 1 | 1 | 0 | 0 | X | X | X | X | X | X |
| JVS | #OFFSET | JUMP OVERFLOW SET | | | | | VSET | 1 | 0 | 1 | 1 | 0 | 0 | 0 | 1 | 0 | 0 | X | X | X | X | X | X |
| JGT | #OFFSET | JUMP GREATER THAN (SIGNED COMPARE) | | | | | Z CLEAR AND N=V | 1 | 0 | 1 | 1 | 0 | 0 | 1 | 1 | 0 | 0 | X | X | X | X | X | X |
| JGE | #OFFSET | JUMP GREATER EQUAL (SIGNED COMPARE) | | | | | N=V | 1 | 0 | 1 | 1 | 0 | 1 | 0 | 1 | 0 | 0 | X | X | X | X | X | X |
| JLT | #OFFSET | JUMP LESS THAN (SIGNED COMPARE) | | | | | N<>V | 1 | 0 | 1 | 1 | 0 | 1 | 1 | 1 | 0 | 0 | X | X | X | X | X | X |
| JLE | #OFFSET | JUMP LESS EQUAL (SIGNED COMPARE) | | | | | Z SET OR N<>V | 1 | 0 | 1 | 1 | 1 | 0 | 0 | 1 | 0 | 0 | X | X | X | X | X | X |
| JHI | #OFFSET | JUMP HIGHER (UNSIGNED COMPARE) | | | | | C SET AND Z CLEAR | 1 | 0 | 1 | 1 | 1 | 0 | 1 | 1 | 0 | 0 | X | X | X | X | X | X |
| JLS | #OFFSET | JUMP LESS SAME (UNSIGNED COMPARE) | | | | | C CLEAR OR Z SET | 1 | 0 | 1 | 1 | 1 | 1 | 0 | 1 | 0 | 0 | X | X | X | X | X | X |
| CALL | Rp OR #ABSOLUTE(32) | CALL SUBROUTINE | | | | | PUSH PC, CALL | 1 | 0 | 1 | 1 | 1 | 1 | 1 | 1 | 0 | 0 | Rp | | | X | X | X |
| STACK | | | | | | | | | | | | | | | | | | | | | | | |
| PUSH | Rs | PUSH Rs ONTO STACK | | | | | SP=SP-SIZEOF(Rs),*SP=Rs | 1 | 1 | 0 | 0 | 0 | 0 | 0 | 0 | G | G | Rs | | | X | X | X |
| POP | Rd | POP Rd FROM STACK | | | | | RD=*SP,SP=SP+SIZEOF(Rd) | 1 | 1 | 0 | 0 | 0 | 0 | 1 | 0 | G | G | Rd | | | X | X | X |
| GATE CALL | | | | | | | | | | | | | | | | | | | | | | | |
| GCALL | Rg | Rg IS ADDRESS VALUE IN SYMBOL TABLE | | | | | | 1 | 1 | 1 | 0 | 0 | 0 | 0 | 0 | 0 | 0 | Rg | | | X | X | X |

FIG. 8

VIRTUAL MACHINE EMULATION IN THE MEMORY SPACE OF A PROGRAMMABLE PROCESSOR

RELATED APPLICATIONS

The present application claims domestic priority under 35 U.S.C. §119(e) to U.S. Provisional Patent Application No. 60/415,825 filed Oct. 3, 2002.

FIELD OF THE INVENTION

This invention relates generally to the field of digital data processing devices and more particularly, but not by way of limitation, to a system and method for emulating a virtual machine within the memory space of a programmable processor using a virtual machine instruction set having a format that is independent of the hardware architecture of the processor, to allow the concurrent evaluation of execution of native code by the processor.

BACKGROUND

Programmable processor-based devices are increasingly common in the current consumer products marketplace. One popular class of such devices are data storage devices, such as hard disc drives, optical disc (CD, DVD) players and recorders, magnetic digital tape (DAT) players and recorders, digital cameras, etc.

Such devices typically include a hardware/firmware based data interface circuit with a programmable processor (controller). A host device makes data transfer requests over a primary communication pathway using an established communications protocol (Fibre Channel, SCSI, ATA, RS-232, etc.).

The controller provides top level control of the operation of the device using associated programming stored in memory. Such programming includes operational routines that are executed as required to facilitate normal operation of the device, as well as test routines that can be selectively executed to certify and diagnose the operation of the device during manufacturing and field use. The test routines can be accessed through the primary communication pathway or through a separate command pathway, such as a serial bus connected in parallel with the primary pathway.

Manufacturers often concurrently offer a number of different types and models of processor-based devices with varying levels of performance and features to meet different price points and other marketing requirements. Such devices may utilize different types and architectures of processors, such as digital signal processors, DSPs; standard PC-type processors such as the Intel Pentium® and X86 classes of processors; ARM devices (Advanced RISC (Reduced Instruction Set Computer) Machines), etc. Each of these generally has unique coding structures and requirements specific to the particular hardware architecture of the individual processors.

Because market pressures continue to press manufacturers to develop successive generations of processor-based devices with ever higher levels of performance at successively lower cost, there remains a continued need for improvements in the manner in which test code is generated and implemented, and it is to such improvements that the present disclosure is directed.

SUMMARY OF THE INVENTION

In accordance with preferred embodiments, an apparatus and method are provided to emulate a virtual machine in the physical memory space of a programmable processor.

The apparatus generally includes a processor-based device in which native functions executed by the processor are stored in a format determined by a hardware architecture of the processor. The virtual machine is concurrently emulated by the processor to execute virtual functions each in a standardized format determined irrespective of the hardware architecture of the processor. Execution of a selected virtual function by the virtual machine causes the processor to execute a corresponding native function, with the corresponding native function being used to evaluate concurrent execution of at least one other native function.

Preferably, the virtual machine comprises a symbol table that maps each virtual function to the corresponding native function, an execution block coupled to the symbol table which executes the virtual functions, and a gate call interface block which, when the execution engine block executes the selected virtual function, accesses the symbol table and initiates a gate call function to cause the processor to execute the corresponding native function.

Moreover, the execution of the corresponding native function by the processor preferably results in a return data value, and the virtual machine further operates to provide the return data value to a host device. Preferably, the native functions comprise both operational routines and test routines, the operational routines carried out to facilitate normal operation of the device and the test routines carried out to identify error conditions associated with the normal operation of the device. Hence, the virtual machine preferably operates to execute one of the native test routines to evaluate one or more of the native operational routines. The method generally comprises steps of providing a set of virtual functions each in a standardized format determined irrespective of the hardware architecture of the processor, and using the virtual machine to execute a selected virtual function which causes the processor to execute a corresponding native function, wherein the corresponding native function evaluates concurrent execution of at least one other native function.

The method further preferably comprises a prior step of a symbol table that maps selected virtual functions to the corresponding native functions, and the using step further preferably comprises accessing the symbol table to identify the corresponding native function and performing a gate call operation to execute the corresponding native function.

In this way, virtual code in which the virtual functions are expressed can be established for a number of different processor architectures, facilitating development, diagnostic and test functions by technical personnel in a fast and efficient manner.

These and various other features and advantages which characterize the claimed invention will be apparent from a reading of the following detailed description and a review of the associated drawings.

BRIEF DESCRIPTION OF THE DRAWINGS

FIGS. 7 and 8 provide a list of preferred descriptions and formats of various VM functions of the VM code.

DETAILED DESCRIPTION

Figure 1:
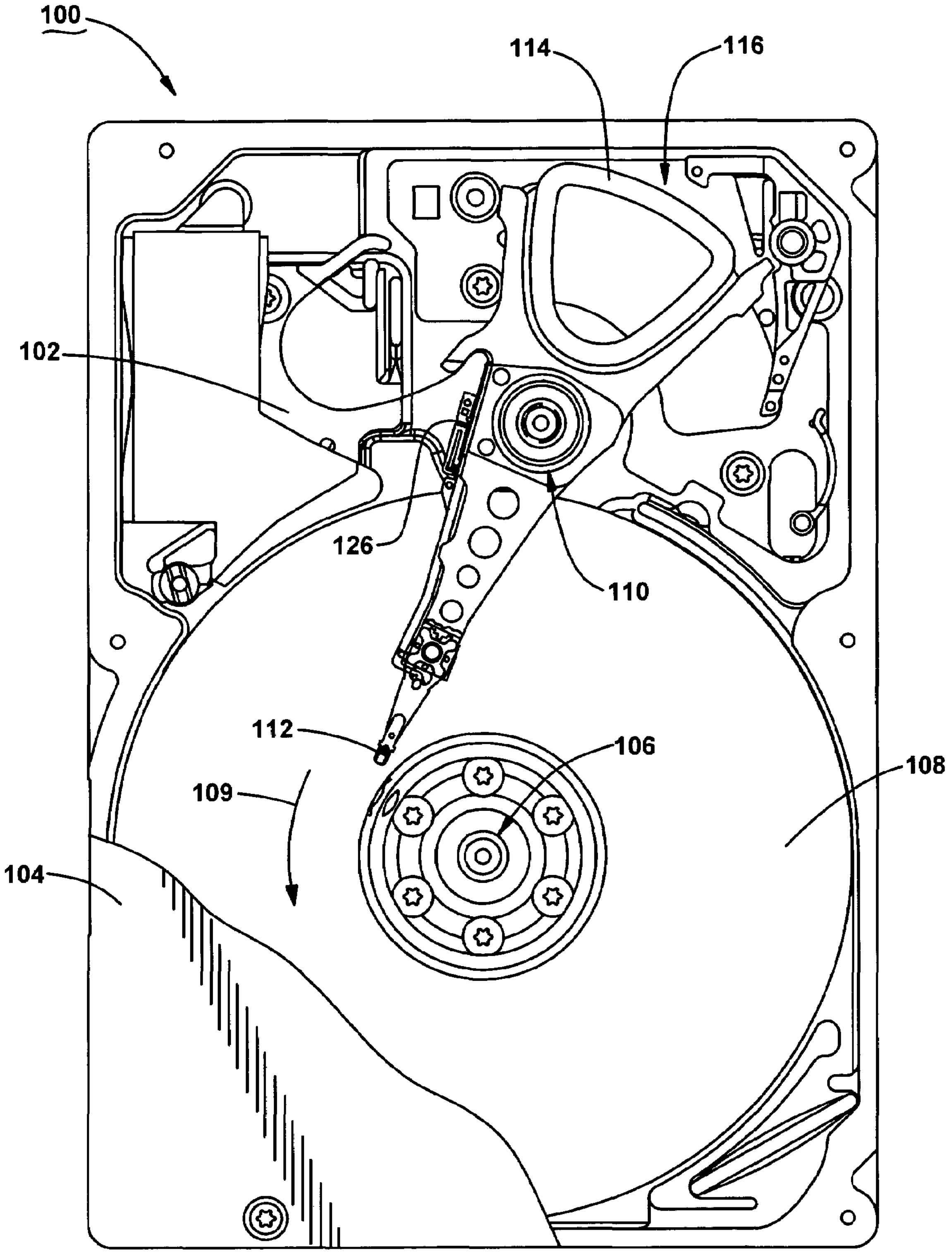
FIG. 1 is a top plan view of a processor-based data storage device constructed and operated in accordance with preferred embodiments of the present invention.

To illustrate an environment in which presently preferred embodiments of the present invention can be advantageously practiced, FIG. 1 shows a processor-based data storage device 100 of the type used to store and retrieve digital data. The device 100, preferably characterized as a hard disc drive, includes a base deck 102 which cooperates with a top cover 104 (shown in partial cutaway) to form an environmentally controlled housing for the device 100.

A spindle motor 106 supported within the housing rotates a number of rigid magnetic recording discs 108 in a rotational direction 109. An actuator 110 is provided adjacent the discs 108 and moves a corresponding number of heads 112 across the disc recording surfaces through application of current to an actuator coil 114 of a voice coil motor (VCM) 116. Data are written to and read from a number of concentric tracks (not shown) defined on the disc surfaces by servo data written to the discs 108 during manufacturing. User data are stored on the tracks in data sectors (not shown) defined during a media formatting operation in areas between adjacent servo sectors.

Figure 2:
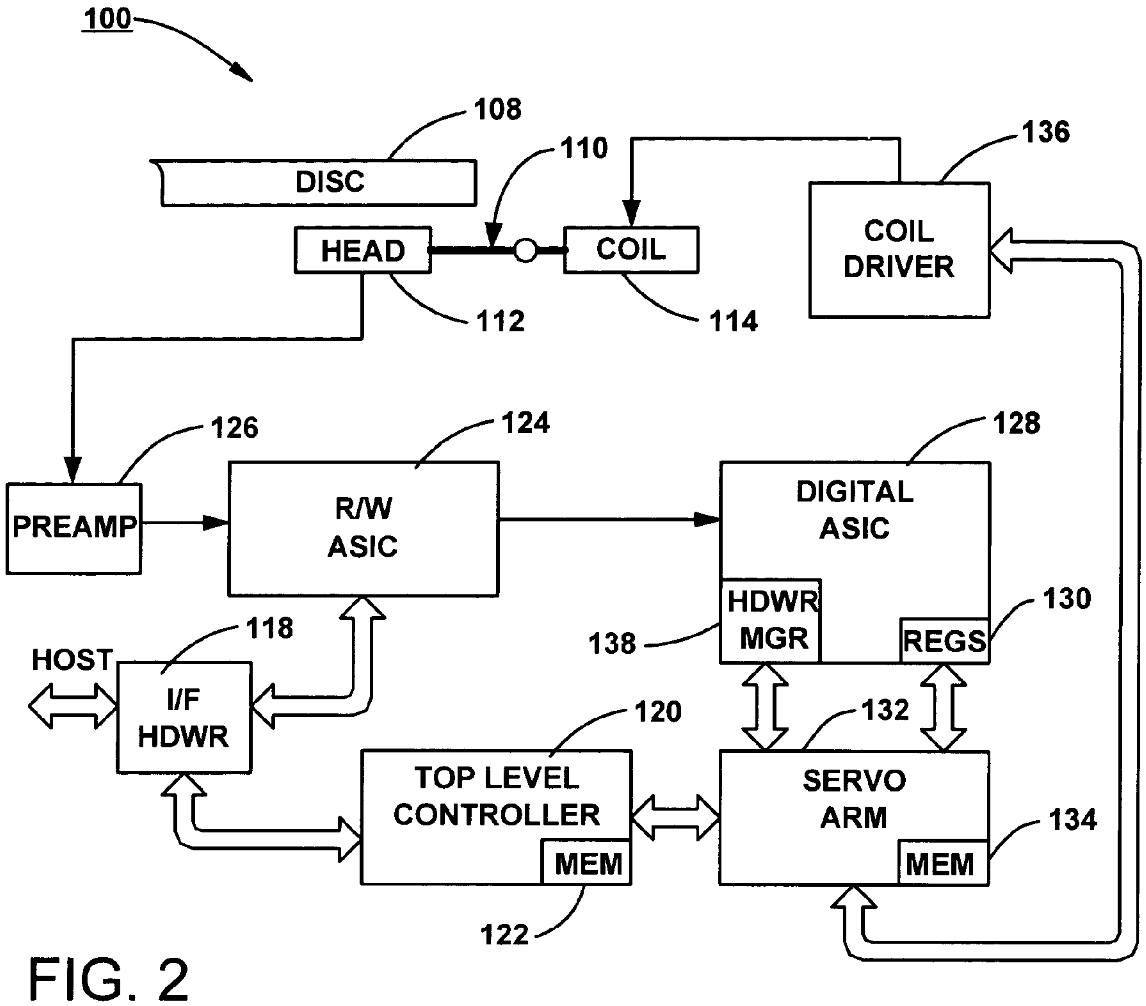
FIG. 2 is a functional block diagram of communication and control electronics of the device of FIG. 1.

FIG. 2 generally illustrates communication and control electronics of the device 100 of FIG. 1. Interface (I/F) hardware 118 provides communication ports with the host device and includes a data buffer, error correction code (ECC) circuitry, and a sequencer (disc manager). Overall control is provided by a top level controller 120 with associated memory 122. The controller 120 and interface hardware 118 operate in accordance with a selected industry standard host communications protocol, such as Fibre Channel.

A read/write application specific integrated circuit (RIW ASIC) 124 includes read and write channel circuitry to provide the requisite encoding for data to be written to the discs 108 during a write operation, and the requisite signal processing to decode transduced readback signals from the selected head 112 during a read operation. Such readback signals first undergo preamplification by a preamplifier/driver circuit (preamp) 126 mounted to the side of the actuator 110 (FIG. 1).

The R/W ASIC 124 includes servo demodulation capabilities that enable the device to decode the prerecorded servo data from the disc 108 and provide such data to a digital ASIC 128. The digital ASIC 128 conditions the servo data by detecting the various different types of servo data (Gray code track address information, position dibit data, etc.) and arranging the data into multi-bit form (e.g., 16-bits).

The conditioned servo data are loaded into registers 130 for retrieval by a servo ARM (advanced RISC (reduced instruction set computer) machine) device 132. The ARM device 132 is a servo processor which operates in accordance with programming in ARM memory 134 and instructions from the controller 120. The ARM device 132 outputs coil current commands to a coil driver 136 which in turn applies the appropriate current to the actuator coil 114 to position the selected head 112 as desired across the surface of the associated disc 108.

The digital ASIC 128 further includes a hardware manager 138 which provides various timing control functions for reference by the ARM device 132. It will be noted that while the top level controller 120 and the servo ARM device 132 are shown as separate components, these separate functions can be carried out by a single processor device with sufficient bandwidth and processing capabilities to concurrently coordinate both data transfer and servo operations.

Figure 3:
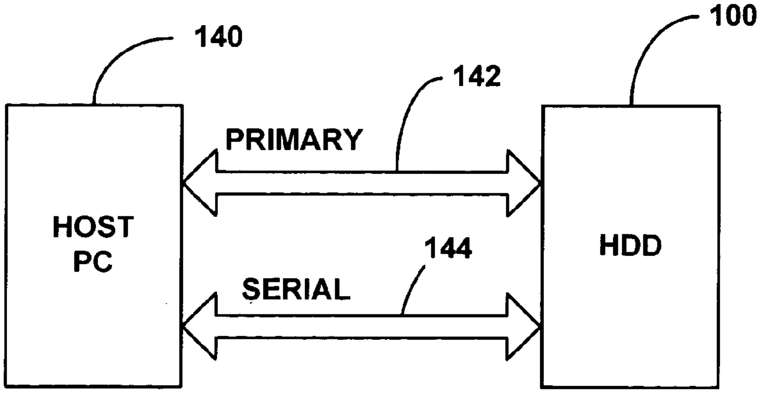
FIG. 3 shows the device of FIG. 1 in conjunction with a host computer (PC).

Normal data and control communications between the disc drive (HDD) 100 and a host device (host personal computer, PC) 140 are preferably carried out using a primary communications pathway (bus) 142, as shown in FIG. 3. In addition, a dedicated command communications pathway (serial bus) 144 is preferably utilized to allow access to test routines used to certify and/or diagnose the operation of the device 100 during manufacturing and field use. Alternatively, some or all of the test routines can be accessed using the primary communications pathway 140.

Figure 4:
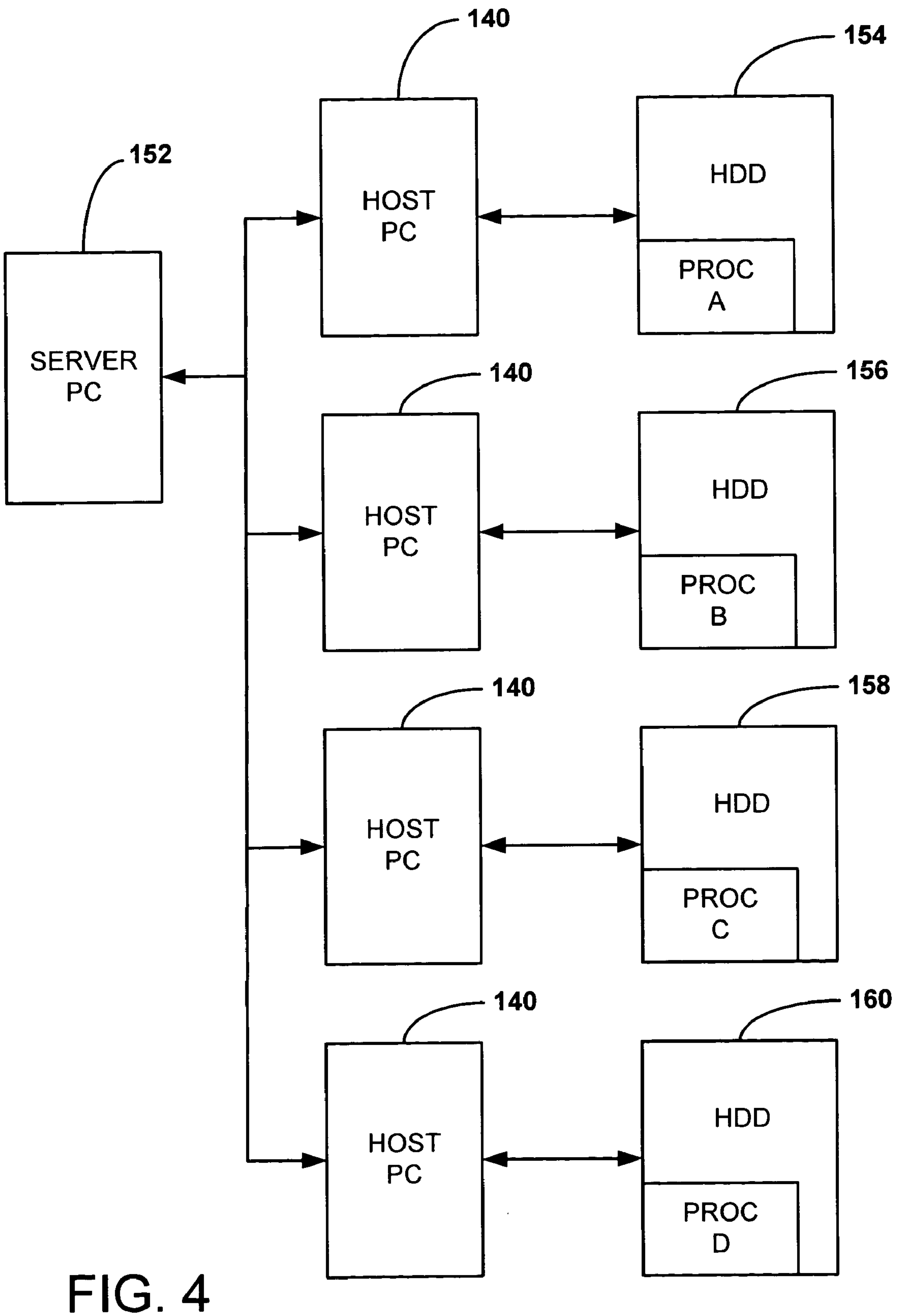
FIG. 4 generally illustrates a computer network of a number of different data storage devices each utilizing a different processor architecture.

FIG. 4 provides a generalized representation of a computer network 150 in a device manufacturing environment. A server PC 152 communicates with a number of host PCs 142, which are in turn locally connected to a corresponding number of different devices (drives) 154, 156, 158, 160. The devices 154, 156, 158, 160 are generally similar to the device 100 discussed above, but utilize different top level and/or servo processors (denoted respectively as PROC A–D).

FIG. 4 serves to illustrate a challenge often faced by device manufacturers that provide a number of different types and models of devices that utilize different processors with different hardware architectures. At a top level, the device manufacturer typically desires to carry out the same general types of certification and diagnostic tests on each type of device.

For example, it is contemplated that each type of device 154, 156, 158, 160 undergoes certain parametric configuration testing to set various parameters relating to the various circuits shown in FIG. 2 (R/W ASIC 124, digital ASIC 128, parameters and tables used by the servo ARM device 132, etc.).

The devices further typically undergo various types of certification type testing in which multiple test data patterns are written and reread to gauge error rate performance under various operational conditions (run-in), etc. These and other routines are performed to set up the devices for field use and to certify that the devices conform to various specifications prior to shipment. Such routines are further advantageously employed during field use for diagnostic purposes.

These and other routines are typically carried out by the top level controller 120 accessing specific test routines stored in top level controller memory 122. The routines are initiated by commands provided by the host PCs 140 via the primary or serial bus 142, 144, or executed independently on the drives internally. In a high volume manufacturing environment such as contemplated by FIG. 4, it is desirable to automate such routines to reduce the need for human intervention. Thus, concurrent with the design effort to establish the design of each different device 154, 156, 158 and 160 is an effort to generate the requisite test routines to enable the certification and diagnosis of the devices.

Historically, a significant development effort has been necessary to generate the appropriate test routines in the native code of each processor, as well as the necessary initiation and control routines at the host PC 140 level to carry out the desired testing operations. As will be recognized by those skilled in the art, the development of code for a high performance, complex device is a structured activity that involves numerous revisions and iterations as various improvements and modifications to other mechanical and electrical aspects of the device are implemented during the design process.

At first glance, it might appear easier to simply wait and begin the test code development process until after the design is fully completed. However, such an approach is impractical for several reasons. Not only would this approach add significant time to the overall design cycle, but more importantly, the test routines are often needed during the development process to help determine the viability and selection of various design alternatives along the way.

Another complicating factor is the existence and use of different revisions of code within the same type of product to support different interfaces, capacities, customer requirements, etc. This further increases the complexity of the diagnostic execution and reporting effort.

Accordingly, the present invention (as embodied herein and as claimed below) provides a significantly improved approach to the development and use of test (certification and diagnostic) routines. Generally, a virtual machine is developed as a standard processor with a standardized code set and library of operations. The virtual machine defines standard component interfaces which are groups of functions that consistently represent particular hardware/software components of different devices regardless of the underlying architecture.

The virtual machine is not realized in hardware as a discrete physical element, but instead is emulated within the memory spaces of each of a number of different processor platforms with different hardware architectures (e.g., PROC A–D). Symbol tables and command gateways are utilized to translate standard commands into the native code instructions unique to each individual processor, and to format the output results into a standardized format for the user.

Figure 5:
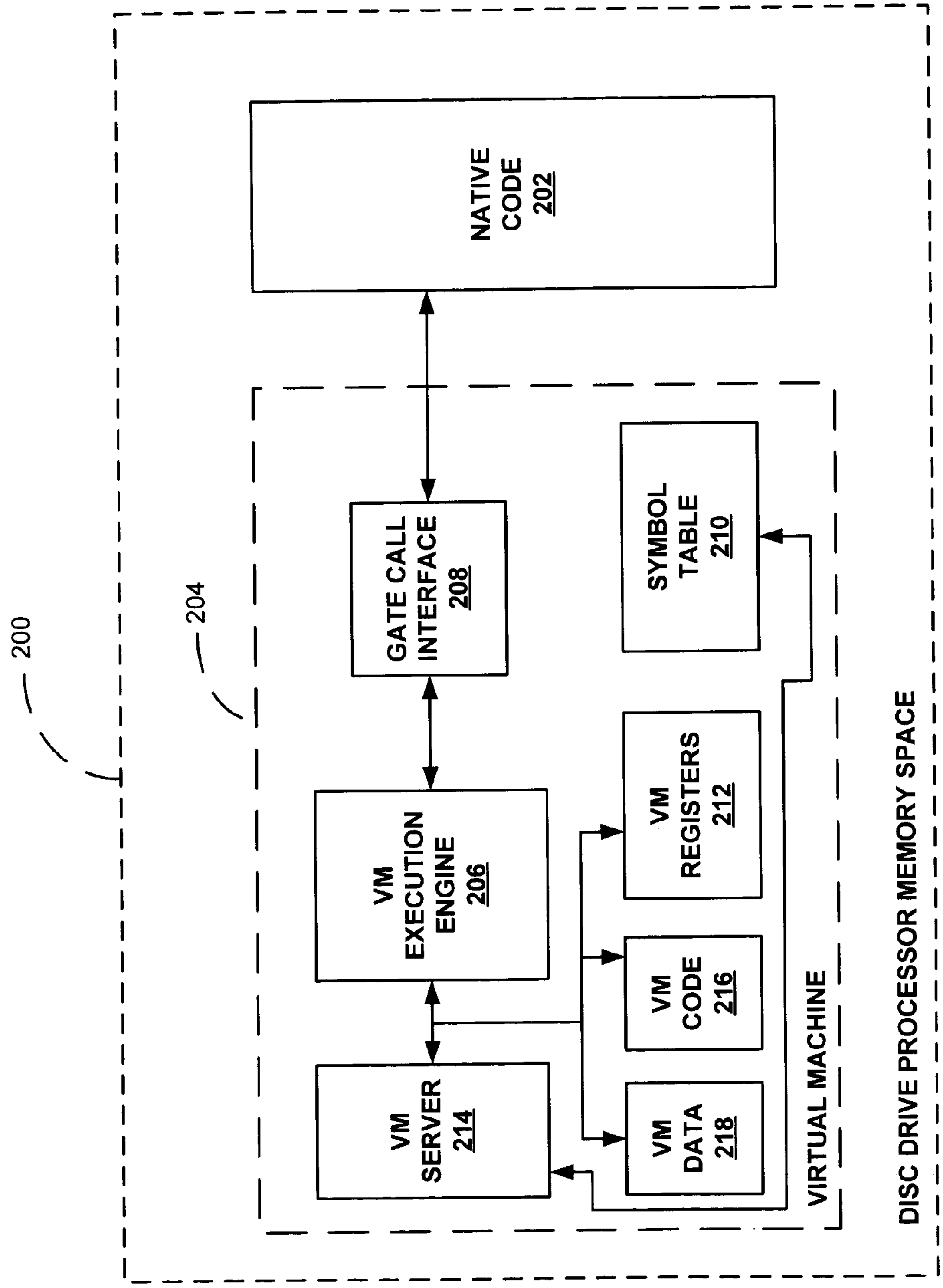
FIG. 5 provides a functional block diagram representing the memory space of a selected device controller (processor) which includes a virtual machine (VM) constructed and operated in accordance with preferred embodiments of the present invention.

FIG. 5 provides a schematic representation of a disc drive processor memory space 200. This memory space comprises the memory utilized by the native processor of the device. For purposes of providing a concrete example, it will be contemplated that the memory space 200 corresponds to the memory 122 for controller 120 of the device 100 as shown in FIG. 2. However, it will be expressly understood that the same modules are generally provided to the respective memory spaces of a number of different types of devices, such as the devices 154, 156, 158 and 160 of FIG. 4 (using the different processors PROC A–D).

The memory space 200 includes a native code block 202 representative of the existing programming utilized by the controller 120. This native code comprises a sequence of native instructions in a format determined by the hardware architecture of the controller 120. The controller 120 executes the native code to carry out various native functions of the device. The native functions thus represent subroutines of at least one instruction that carry out some desired operation. The native functions preferably include operational routines executed to facilitate normal operation of the device 100 (such as the reading and writing of data) as well as test routines that operate to identify error conditions associated with the normal operation of the device 100 (such as the aforementioned certification and diagnostic functions).

The memory space 200 further includes a virtual machine (VM) block 204. Preferably, the VM block 204 is a 32-bit virtual machine that can be emulated by most modem processors. The VM block 204 provides complete support for structured programming while maintaining a small enough footprint to exist in an embedded environment. The VM block 204 is shown to preferably include a VM execution engine 206, a gate call interface (GCI) block 208 and a symbol table 210. VM registers 212 and a VM server 214 are also provided. A VM code block 216 stores VM code to be executed by the engine 206, and a VM data block 218 stores return data values, such as variables, data structures, etc. The structure and operation of each will be discussed in detail below.

Generally, the engine 206 is a software state machine driven by the VM code and VM data via the VM registers 212. An exception to this is the use of gate call instructions (GCALL). When the engine 206 encounters a GCALL instruction, a native function is invoked via the GCI block 208. The GCI block 208 uses information in the symbol table 210 to map a virtual function with a corresponding native function and to shepherd parameters and return values between the engine 206 and the native code 202.

The VM block 204 is preferably designed to have the following characteristics:

1. Platform Independency: the VM architecture makes no assumptions about the native processor Endian order, memory architecture, register architecture or instruction set; in other words, the VM code takes a format that is independent of the hardware architecture of the processor.

2. Native Optimization: the VM architecture does not prevent VM code from being converted into native instructions for faster execution.

3. Structured Programming: the VM architecture provides the necessary instruction set to support structured programming. Preferably, C language is the base line.

4. Native Function Access: native functions that are accessed by VM code are not exclusive for the VM, but are rather available to the native code without special consideration.

5. Safety: the VM architecture isolates VM code and data from native code and data. The VM code can preferably only invoke those native functions that are made available to it through the GCI block.

For reference, it will be helpful to define the term "VM code" to preferably describe a block of 16-bit values that tell the VM block 204 what operation to perform. The term "VM data" is preferably defined as a block of 8-bit values that are referenced as any combination of values or arrays of values associated with the particular operation in progress.

The engine 206 is invoked with three non-overlapping native data regions containing the VM code, VM data and VM registers (i.e., blocks 216, 218 and 214, respectively). Each time that the engine 206 access the VM code or VM data, it verifies that those accesses are contained within the regions originally specified at invocation. Consequently, the engine 206 operates within "sandboxes" to prevent errant or malicious code from adversely affecting operation.

The VM instruction set is a modified load/store architecture. Three classes of data are recognized: global, local and parameter. This architecture limits the number of instructions that require checking sandboxes, and the designation of these three classes of data reduce the need for expensive stack manipulations required to access stack-based local variables and parameters. A preferred listing and description of various instructions is provided hereinbelow.

Figure 6:
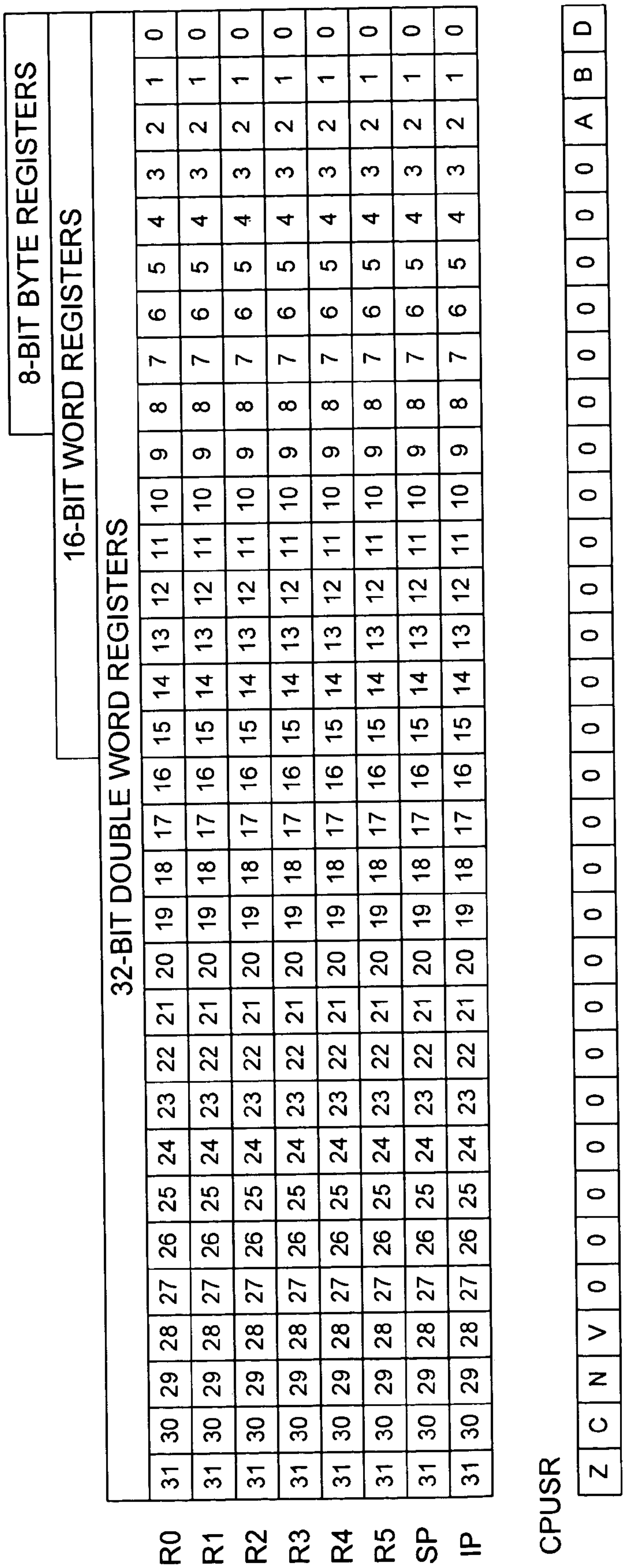
FIG. 6 generally illustrates a preferred format for a VM register block shown in FIG. 5.

As shown in FIG. 6, the VM registers 212 preferably comprise eight directly accessible 32-bit registers (denoted R0–R5, SP and IP) and an indirectly accessible 32-bit CPU Status Register (CPUSR). The contents of the directly accessible registers can be explicitly manipulated via the instruction set, whereas the contents of the CPUSR register are set implicitly based on the outcome of certain VM instructions. The eight directly accessible registers can be accessed as the lower byte (8-bit), lower word (16-bit) or the entire double-word (32-bit). The CPUSR register is preferably used primarily for conditional branches and complex mathematical operations.

The general purpose registers R0–R5 are commonly used to provide the returned value from a called function, or register based local variables. Otherwise, there are generally no restrictions on the use of these registers.

The SP (stack pointer) register points to the lowest address element on the stack and is used by the PUSH, POP and CALL instructions. The VM Stack operates as a decrement-and-store for a PUSH instruction and a load-and-increment for a POP instruction. An implicit PUSH IP occurs during a register based CALL instruction.

The IP (instruction pointer) register points to the next instruction to be processed. The lowest bit of this register is preferably ignored. Each instruction cycle begins with a fetch of the instruction pointed to by the IP register and ends with the incrementing of the IP register by 2. The combination of the CALL instruction and the POP IP instruction create the call/return sequence used in sub-routine handling.

The CPUSR register preferably contains four operational flags: zero, carry, negative and overflow (ZCNV), and three control flags: abort, branch and debug (ABD). The flags occupy bits 31–28 and bits 2–0, respectively. To optimize performance, not all instructions utilize the flags as such are not always necessary for every type of instruction.

The VM code and data are addressed separately and are generally not allowed to overlap. VM code is read-only and is implicitly accessed according to the value in the IP register at the beginning of each instruction cycle. VM data are accessed only through the load and store instructions (LDG, STG, LDL, STL, PUSH and POP, discussed below).

VM code elements are 16-bit quantities and are aligned on two-byte boundaries. All VM instructions are preferably encoded as one or more of these 16-bit quantities. VM data elements preferably have no alignment restrictions and can be addressed as quantities of one, two or four bytes.

VM code and data are accessed by the engine 206 in the native Endian Order of the particular implementation associated with the particular processor (i.e., whether lower byte addresses at a given location hold the least significant bits or the most significant bits). Any process that places VM code and data into memory is responsible for ensuring that the correct Endian Order is utilized prior to invoking the engine 206. Generally, programmers can determine Endian Order scheme at compiling time, if such information is not already known for the given platform. For example, a 2-byte value such as 0×55AAH can be written to a selected location. When a 1-byte value is subsequently read back from the same location, a readback value of 0×55H will indicate a Big-Endian platform while a readback value of 0×AAH will indicate a Little-Endian platform.

The GCI block 208 operates as a link between VM functions and native functions. Function calling conventions are differentiated by two characteristics: the order the parameters are pushed onto the stack and whether the calling or called function is responsible for maintaining the stack.

The C calling convention specifies that arguments are placed onto the stack from right to left and that the calling function is responsible for maintaining the stack. For reference, it will be noted that the C calling convention is preferred for at least two primary reasons: native functions are not normally allowed to restore a VM stack, and native functions are often written in C.

The GCI block 208 is further responsible for ensuring that parameters specified by VM code to be passed into native code do not compromise the system. More particularly, pointers to data types and buffers are validated to ensure that they reside completely within the VM data sandbox.

More specifically, the GCI block 208 preferably includes VM wrappers for each of the called native functions. Each wrapper comprises a module that marshals parameters and return values between the "VM environment" and the "native environment." Examples include the format of the arguments in the stack registers, alignment issues (8, 16, 32 bit aligned), etc.

As previously mentioned, the GCI block 208 is invoked using the GCALL instruction. Generally, a GCALL instruction is similar to a standard CALL function in that arguments are pushed on the stack as though a C function was going to be called. However, instead of calling a VM function with CALL, a native function is called using GCALL.

Another difference is that CALL takes the absolute address of the function to be called as a parameter, whereas GCALL takes a VM register 212 as its only parameter. The specified VM register contains a value that directs the GCI block 208 to call a particular native function. This value is referred to as a gate key and is obtained from the symbol table 210. The gate key is also referred to herein as a "symbol" or a "magic number."

The gate key value is an implementation specific value agreed upon by the VM engine 206 and the GCI block 208. Other than the symbol table entry, no correlation between gate key values and native functions can typically be drawn. Thus, when VM code is executed in different platforms, the gate key values for each specific platform are preferably used.

The symbol table 210 provides component name, function name, argument list and gate key value (symbol) for each native function that is available to the VM code. All elements in the table are preferably case-sensitive. Component names and function names adhere to the same restrictions placed on C function names.

Preferably, the standard representation of the symbol table combines the four elements into a case-sensitive ASCII string using the at-sign (@) as a delimiter. A representative string format is: ComponentName@FunctionName@Arguments@GateKey. This is the gate key (magic number).

The component name is the name of an object containing member functions that operate on a particular hardware/ software/firmware component of the native platform. The component name thus at least represents the logical group to which a function belongs. It is desirable to group functions into components to make such more manageable, maintainable, "object-oriented" and intuitive.

The function name is simply the name of the function. Name mangling is discouraged since arguments are specified in the arguments list. The arguments list provides the number and type of arguments that the native function is expecting. The GCI block 208 uses this information to validate the arguments on the VM stack for sandbox violations. Additionally, higher level languages can use the arguments list to validate that the VM code declaration of a function matches the identification of the function by the symbol table 210.

As mentioned previously, the GCI block 208 and the engine 206 have to agree upon the implementation specific meaning of the gate key value. Generally, the gate key value represents a pointer to a function or an index/hash-key to an internal structure.

A preferred representation of the arguments list uses the following designations:

TABLE 1

| |
|---|
| 1: Byte Value - no bounds checking required |
| 2: Word Value - No bounds checking required |
| 4: Double-Word Value - no bounds checking required |
| B: Byte Pointer - bounds checking required |
| W: Word Pointer - bounds checking required |
| D: Double-Word Pointer - bounds checking required |
| Z: Pointer to a NULL Terminated String - bounds checking required |
| U: Null term to a unicode string |
| P: Paired Argument for Buffer, Buffer Size - bounds checking required. |

It will be noted that P represents a pointer to the Buffer and is followed by a 1, 2 or 4 representing the size of the unsigned integer containing the size of the Buffer.

The GCI block 208 uses the arguments list to determine how many and what types of parameters need to be pushed onto the native stack from the VM stack. All accesses to the VM stack are checked to confirm that the stack lies within the VM data sandbox.

Additionally, if the parameter on the VM stack is a pointer, then the GCI block 208 will de-reference the pointer and confirm that the entire data element, structure or buffer pointed to lies with the VM data sandbox. The actual structure of the symbol table 210 is implementation specific.

Preferred VM instruction sets are represented in the tables of FIGS. 7 and 8. Generally, instructions that specify an immediate bit (noted by an I in bit 8 of the instruction coding columns) will set this bit to use the Immediate Mode of the instruction or clear this bit to use the Register Mode of the instruction. Instructions that specify granularity bits (noted by a G in bit 6 and 7 of the instruction encoding columns) determine whether the instruction will operate on the registers as a byte, word or double-word. Registers that have an explicit bit width specified, such as the PR register, are not affected by granularity bits. Granularity encoding is preferably performed as follows:

TABLE 2

| |
|---|
| 11 = Byte |
| 10 = Word |
| 00 = Double-Word |

Instructions that contain unspecified bits (noted by an X in a bit position of the instruction encoding columns) will accept any value in these bits. Such bits may be useful for encoding debug information into the code. It is recommended, however, that such bits be set to zero during normal operation.

Registers are encoded into instructions in three-bit groups. The three bits specify a base register. Combining a base register with the granularity bits specifies a specific register. Base register encoding is preferably performed as follows:

TABLE 3

| |
|---|
| 00 = R0 |
| 01 = R1 |
| 02 = R2 |
| 03 = R3 |
| 04 = R4 |
| 05 = R5 |
| 06 = SP |
| 07 = IP |

Immediate values are specified following the instruction word and the granularity is determined by the granularity bits unless otherwise specified in the instruction description. Immediate double-words are encoded as two words following the instruction word with the most significant word preceding the least significant word.

Immediate words are encoded as a single word following the instruction word. Immediate bytes are encoded as a single word following the instruction word. The most significant 8-bits will be ignored and should be zero filled. These bits can also be used for debug operations.

The instructions shown in FIG. 7 are divided into load/store/no operation, arithmetic and logical operational groupings. The various columns of FIG. 7 are understood as follows. The LDI instruction is a "load immediate value to register" operation, which loads a designated register with an immediate value. The format of the instruction is LDI [Destination Register], [Immediate Value]. No ZCNV flags are set, and the encoding string is 0 0 1 0 0 0 0 1 G G Rd X X X. Remaining instructions shown in FIG. 6 are decoded in like manner.

The instructions shown in FIG. 8 are divided into Shift, Branch, Stack and Gate Call operational groupings. By way of example, the LSL instruction is a "logical shift left" operation, which shifts the value in the destination register left the number of bits specified in the number register. Zero fills the least significant bit and discards the most significant bits. The format of the instruction is LSL [Destination Register] [32-bit Number Register]. No ZCNV flags are set, and the encoding string is 1 0 0 0 0 0 0 0 G G Rd Rn. Remaining instructions shown in FIG. 8 are decoded in like manner.

Figure 9:
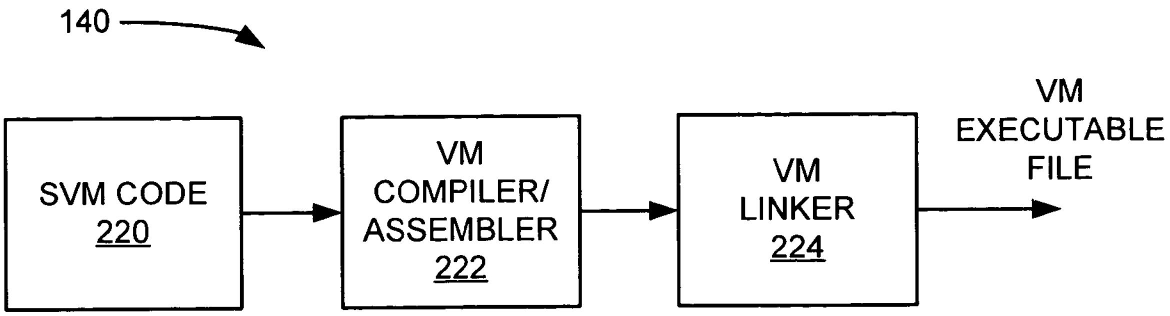
FIG. 9 is a functional block diagram illustrating a preferred methodology for generating the VM code.

FIG. 9 provides a functional block diagram representation of the PC host 140 to generally illustrate a preferred manner in which VM code is generated for the device, including the instructions to be executed and the format of the returned data. Top level code is generated by the user as represented by PC code block 220. This code is preferably written in C language and identifies the particular operations desired to be carried out by the engine 206. The completed code is compiled by a VM compiler/assembler block 222, which generates corresponding object code.

Figure 10:
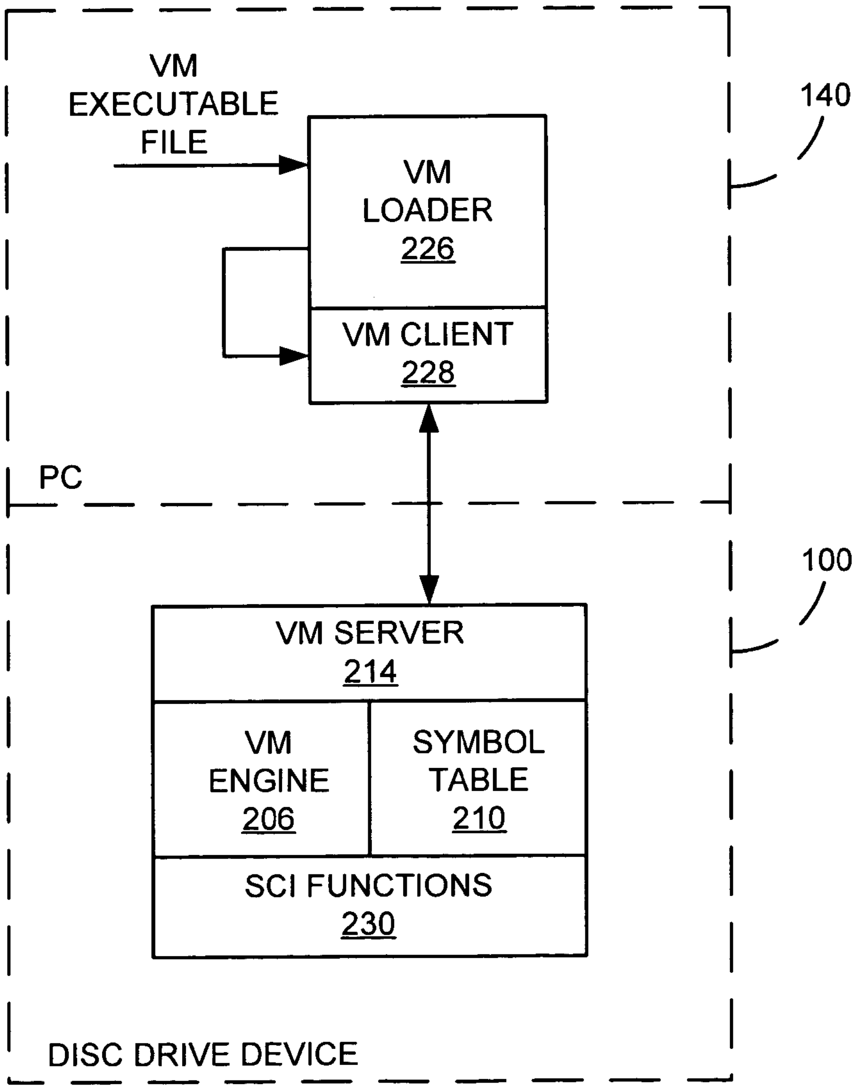
FIG. 10 generally illustrates a preferred methodology for executing the VM code.

A VM linker block 224 generates an executable (EXE) file with relocation pointers to the variously desired standard component interface functions. As shown in FIG. 10, the executable file is then provided to a VM loader block 226 which places the various gate keys in global data areas (by way of the symbol table 210). When the user subsequently launches the executable file, the file activates a VM client block 228 which manages communications with the VM server block 214 of the device 100 to execute the library of standard component interface (SCI) functions (represented by block 230).

It will be noted that, as discussed above, the gate keys are placed in the global data area so that, at run time, such can be loaded into the registers and called in turn. The VM engine 206 will use the symbol table 210 during gate calls to find out what parameters to load and what values will be returned. Calls involve VM functions while gate calls (GCALLs) carry out the SCI functions.

All of the information required by the VM engine 206, including the type of memory alignment to be carried out, are provided by the compiled PC code. The symbol table 210 basically correlates the SCI functions and the gate keys. Thus, as mentioned above the gate key operates as a pointer or an index/hash-key to an internal structure in the native code 202, thereby allowing the native function (via the GCI block 208) to actually execute the function call.

As mentioned previously, the native functions of various devices are preferably arranged as a standardized list (e.g., the Standard Component Interface or SCI functions). While not required, arranging these functions in this manner provides greater flexibility in using the same VM code across different platforms. While SCI functions will tend to be device-type dependent, illustrative examples of SCI functions for a data storage device (such as 100) include sector identification, defect management, event logging, R/W functions, and servo functions, among others.

More specifically, as those skilled in the art will appreciate, there are different ways to identify specific sectors in a data storage device, including logical block address (LBA), physical block address (PBA), cylinder/head/sector (CHS), and radius/angle/length (r, θ, z). Each of these methodologies can be used to identify a particular sector address, but standardizing these across different platforms would enhance the ability to reference specific sectors in the VM code regardless of the platform.

Continuing along these lines, with regard to defect management, data storage devices that utilize SCSI based architectures typically maintain defective sectors in a sequence of lists (e.g., P, G, C and D lists). These lists indicate when the various known defects were identified (i.e., during factory test, during field use, during a formatting operation, or other), which among other things helps to assess and predict future performance of the device. Devices that utilize other architectures (such as ATA) do not necessarily organize defective sectors in this manner, so defect list reporting may tend to be in a different format for an ATA drive than for a SCSI drive. However, using SCI function would allow a standardized way to report defects regardless of the platform, and enhance the usefulness of the VM code across different types of users.

Similar benefits can be obtained for event logging (i.e., the manner in which successively executed scripts are identified), R/W functions (error retries, reading contents of particular sectors, ECC settings, etc.), and servo functions (seek methodologies, read and write offsets, etc.).

Figure 11:
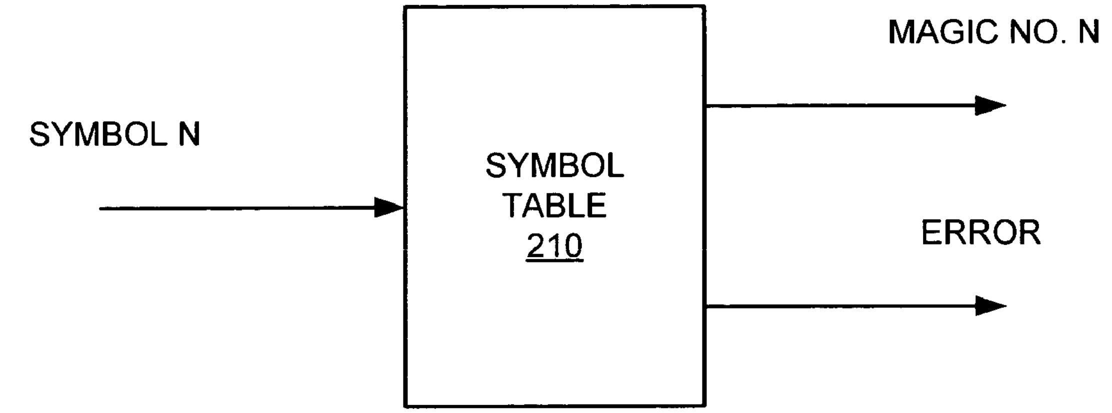
FIG. 11 generally illustrates the manner in which the symbol table is referenced during execution of the virtual machine.
Figure 12:
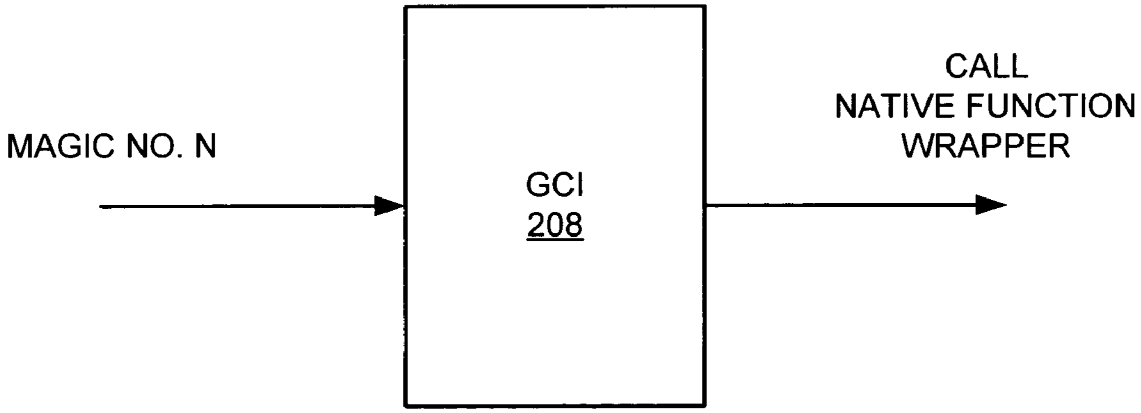
FIG. 12 generally illustrates the manner in which the gate call interface (GCI) operates during execution of the virtual machine.

FIGS. 11 and 12 generally illustrates the general manner in which the corresponding native function is called in response to execution of a selected virtual function. In FIG. 11, the symbol table 210 is accessed to identify the gate key (i.e., magic no. N). In FIG. 12, the GCI 208 uses the magic no. N to identify and call the corresponding native function in the native processor environment. As described above, addresses as well as descriptors are included to enable the native functions to be executed.

Figure 13:
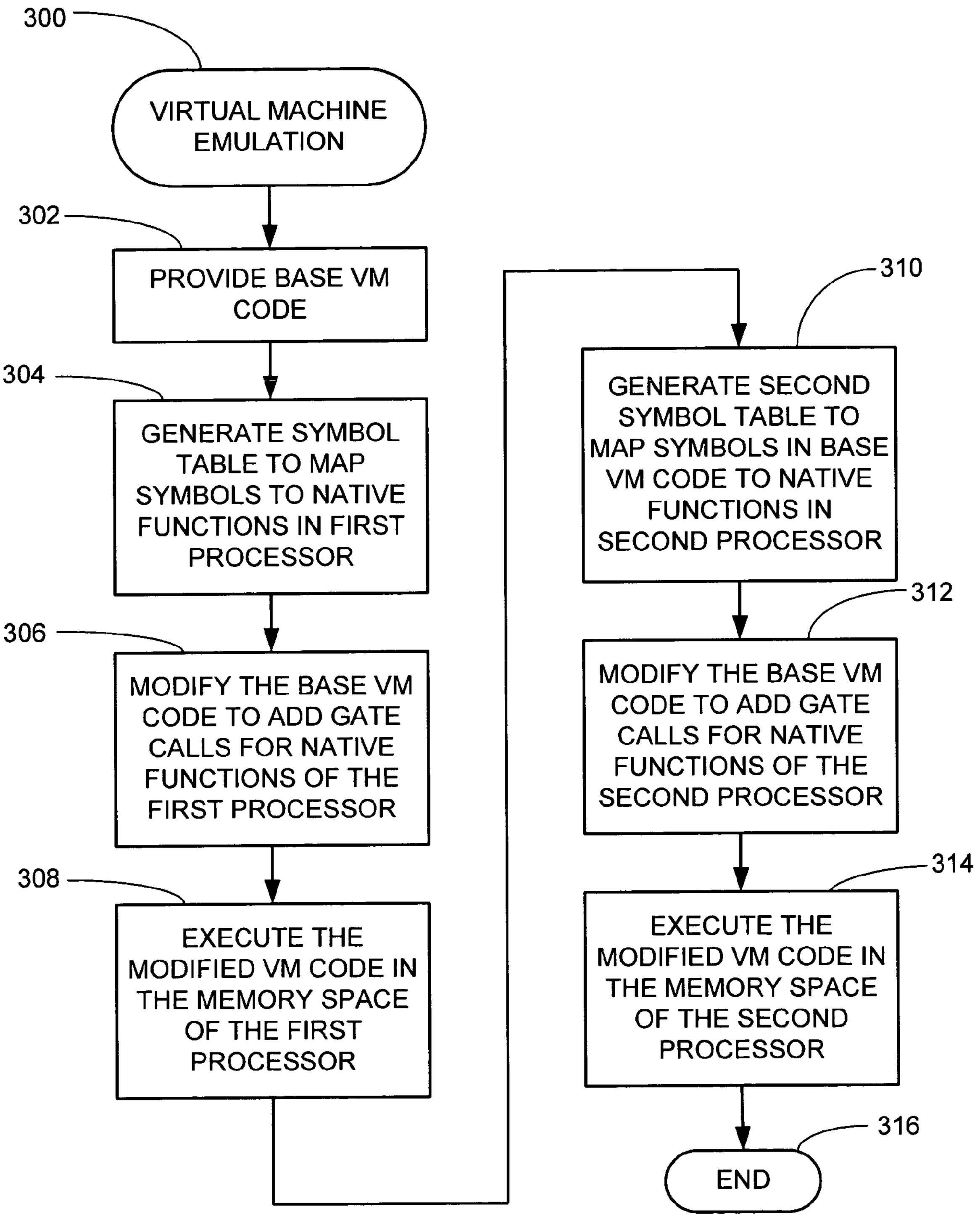
FIG. 13 is a flow chart for a VIRTUAL MACHINE EMULATION routine, generally representative of steps carried out in accordance with preferred embodiments of the present invention.

FIG. 13 provides a flow chart for a VIRTUAL MACHINE EMULATION routine 300, generally illustrative of steps carried out in accordance with preferred embodiments of the present invention.

At step 302, top level VM code is provided as a sequence of virtual machine instructions in a standardized format (such as previously discussed during PC code block 222). As discussed above, the instructions are processor architecture independent, and thus can be used in a number of different processors.

A symbol table (such as symbol table 210 discussed in FIGS. 5 and 9) is next generated at step 304 that maps at least selected VM symbols to corresponding native functions in the native code (block 202, FIG. 5). The symbol table, of course, is processor dependent, although the symbol table can use a standardized set of the VM instructions as a starting point (i.e., different processors will have different corresponding native functions in the table).

The VM code generated during step 302 is next modified at step 306 to substitute gate call instructions for each VM instruction that invokes a native function by the native code. This modified VM code may be therefore be processor dependent, depending upon the differences among the capabilities of the various processors, the extent to which virtual instructions can be more efficiently executed by the native processor acting as "itself," etc. Compilation and linking steps are performed during step 306 as desired, as discussed above in FIG. 9 to prepare the code for execution by the processor.

Thereafter, as shown by step 308, the modified VM code is executed using an execution engine emulated in the memory space of the processor (such as engine 206 shown in FIGS. 5 and 9). As will be recognized from the foregoing discussion, such execution will include initiating gate calls using the gate call interface block 208 (FIGS. 5 and 9) and the symbol table 210 to invoke native functions by the processor. This allows concurrent evaluation of the execution of the processor of other functions.

FIG. 13 further serves to illustrate an advantageous manner in which the same base VM code (from step 302) is further adapted for use in a second processor having a different hardware architecture as compared to the first processor contemplated during steps 304, 306 and 308. More particularly, as shown by step 310 a second symbol table is generated to map selected VM code instructions to native instructions in the second processor. The base VM code is then modified at step 312 and executed at step 314 in similar fashion using the second processor. The process is shown to end at step 316, but it will be understood that the foregoing steps can be repeated as desired to cover any number of additional processors.

It will now be recognized that the virtual machine 204 provides significant advantages over the prior art. Developing a virtual machine processor wholly in software frees the need to tailor the machine to a particular processor hardware architecture, and eliminates the need to adapt the virtual machine as newer versions of processors or different makes and models of processors are incorporated into the product stream. This frees a device manufacturer to consider a broader range of new processors having significantly different structures as such become commercially available.

Another advantage is that development, manufacturing and field service personnel all can access the same diagnostic functions, and have data returned in the same format.

This facilitates customer service and ensures that problems in the field can be more quickly resolved.

While preferred embodiments have been directed to data storage device (disc drive) processor-based devices, it will be recognized that this is provided for purposes of illustration and is not necessarily limiting to the scope of the claimed invention.

It will now be clear that preferred embodiments of the present invention are generally directed to an apparatus and method for emulating a virtual machine in the memory space of a programmable processor.

The apparatus preferably comprises a programmable processor (such as 120) with an associated memory space (such as 122, 200) which stores native code (such as 202) comprising a sequence of native functions in a format determined by a hardware architecture of the processor, the processor executing the native code to carry out at least one native function.

The apparatus further preferably comprises a virtual machine (such as 204) within the processor memory space and concurrently emulated by the processor, the virtual machine concurrently emulated by the processor and which executes virtual functions (step 314) in a standardized format determined irrespective of the hardware architecture of the processor, wherein the execution of a selected virtual function by the virtual machine causes the processor to execute a corresponding native function, and wherein the corresponding native function is executed to evaluate concurrent execution of at least one other native function.

Preferably, the virtual machine comprises an execution engine block (such as 206) which executes the virtual functions (such as shown in FIGS. 7 and 8), a symbol table (such as 210) that maps selected virtual functions to the corresponding native functions, and a gate call interface (GCI) block (such as 208) which calls the corresponding native functions. Preferably, execution of the native function by the processor results in a return data value, and wherein the gate call interface block further operates to provide the return data value to the host device (such as 140).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the virtual machine without departing from the spirit and scope of the present invention.

In addition, although the embodiments described herein are directed to the emulation of a virtual machine in the memory space of a controller in a data storage device, it will be appreciated by those skilled in the art that the virtual machine and associated methodology can be used in other processor-based environments without departing from the spirit and scope of the claimed invention.

What is claimed is:

1. In a device comprising a programmable processor with an associated physical memory space which stores native functions in a format determined by a hardware architecture of the processor, the improvement comprising a virtual machine concurrently emulated by the processor which executes virtual functions in a standardized format determined irrespective of the hardware architecture of the processor, wherein the execution of a selected virtual function by the virtual machine causes the processor to execute a corresponding native function, and wherein the corresponding native function is executed to evaluate concurrent execution of at least one other native function to enable virtual execution of diagnostic firmware within a disc drive data storage apparatus.

2. The improvement of claim 1, wherein the virtual machine comprises a symbol table that maps each virtual function to the corresponding native function.

3. The improvement of claim 2, wherein the virtual machine further comprises an execution block coupled to the symbol table which executes the virtual functions.

4. The improvement of claim 3, wherein the virtual machine further comprises a gate call interface block which, when the execution engine block executes the selected virtual function, accesses the symbol table and initiates a gate call function to cause the processor to execute the corresponding native function.

5. The improvement of claim 1, wherein the execution of the corresponding native function by the processor results in a return data value, and wherein the virtual machine further operates to provide the return data value to a host device.

6. The improvement of claim 1, wherein the native functions comprise operational routines and test routines, the operational routines carried out to facilitate normal operation of the device and the test routines carried out to identify error conditions associated with the normal operation of the device.

7. The improvement of claim 1, wherein the processor is characterized as a first processor, and wherein the virtual machine is further emulated in a second processor having a different hardware architecture from the architecture of the first processor so that the same virtual functions are executed in both the first and second processors.

8. The improvement of claim 1, wherein the virtual machine further comprises a virtual memory register in which the virtual functions are loaded and sequentially executed.

9. The improvement of claim 1, wherein the device is characterized as a data storage device and the processor is characterized as a controller which provides top level communications and control functions for said device.

10. A method for concurrently emulating a virtual machine in a physical memory space of a programmable processor, the memory space storing native functions in a format determined by a hardware architecture of the processor, the method comprising:

providing a set of virtual functions each in a standardized format determined irrespective of the hardware architecture of the processor, and using the virtual machine to execute a selected virtual function which causes the processor to execute a corresponding native function, wherein the corresponding native function evaluates concurrent execution of at least one other native function to enable virtual execution of diagnostic firmware within a disc drive data storage apparatus.

11. The method of claim 10, further comprising a prior step of generating a symbol table that maps selected virtual functions to the corresponding native functions.

12. The method of claim 11, wherein the using step further comprises accessing the symbol table to identify the corresponding native function and performing a gate call operation to execute the corresponding native function.

13. The method of claim 10, wherein the using step results in generation of a return data value, and wherein the method further comprises communicating the return data value to a host device.

14. The method of claim 10, wherein the processor is characterized as a first processor and wherein the method is performed in combination with a method for concurrently emulating a virtual machine in a second physical memory space of a second programmable processor, the second memory space storing native functions in a format determined by a second hardware architecture of the second processor different from the hardware architecture of the first processor, and wherein the providing and using steps are repeated for the second processor.

15. The method of claim 10, wherein the native functions comprise operational routines and test routines, the operational routines carried out to facilitate normal operation of the device and the test routines carried out to identify error conditions associated with the normal operation of the device.

16. The method of claim 10, wherein the processor is characterized as a controller in a data storage device.

* * * * *